United States Patent
Liao et al.

(10) Patent No.: US 11,561,332 B2
(45) Date of Patent: Jan. 24, 2023

(54) INFRARED SHIELDING FILM AND METHOD FOR MANUFACTURING THE SAME

(71) Applicant: NAN YA PLASTICS CORPORATION, Taipei (TW)

(72) Inventors: Te-Chao Liao, Taipei (TW); Wen-Cheng Yang, Taipei (TW); Chia-Yen Hsiao, Taipei (TW); Chun-Che Tsao, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 17/159,297

(22) Filed: Jan. 27, 2021

(65) Prior Publication Data

US 2021/0263202 A1   Aug. 26, 2021

(30) Foreign Application Priority Data

Feb. 26, 2020   (TW) .................................. 109106145

(51) Int. Cl.
| | | |
|---|---|---|
| *G02B 5/20* | (2006.01) | |
| *G02B 1/11* | (2015.01) | |
| *G02B 5/28* | (2006.01) | |
| *B32B 27/20* | (2006.01) | |

(52) U.S. Cl.
CPC .............. *G02B 5/208* (2013.01); *B32B 27/20* (2013.01); *G02B 1/11* (2013.01); *G02B 5/281* (2013.01)

(58) Field of Classification Search
None
See application file for complete search history.

(56) References Cited

U.S. PATENT DOCUMENTS

| | | | | |
|---|---|---|---|---|
| 8,889,026 B2* | 11/2014 | Fung | ................... | C01G 41/006 252/587 |
| 9,612,366 B2* | 4/2017 | Miratsu | .................. | G02B 5/208 |
| 9,829,613 B2 | 11/2017 | Taguchi et al. | | |
| 10,086,401 B2* | 10/2018 | Chen | ...................... | B05D 1/005 |
| 10,752,512 B2* | 8/2020 | Tsunematsu | ........... | G02B 5/208 |
| 2010/0062242 A1 | 3/2010 | De Meyer et al. | | |
| 2014/0370263 A1* | 12/2014 | Lu | ..................... | B32B 17/10605 428/432 |
| 2019/0002708 A1* | 1/2019 | Tsunematsu | ............. | C09D 7/61 |
| 2019/0176439 A1* | 6/2019 | Hara | ................. | B32B 17/10633 |
| 2021/0109263 A1* | 4/2021 | Liao | ........................ | B32B 27/32 |

FOREIGN PATENT DOCUMENTS

| | | |
|---|---|---|
| CN | 1245748 A | 3/2000 |
| CN | 101644788 A | 2/2010 |
| CN | 102582094 A | 7/2012 |
| CN | 103383472 A | 11/2013 |
| CN | 104231306 A | 12/2014 |
| CN | 104428699 A | 3/2015 |
| CN | 104620144 A | 5/2015 |
| CN | 107710035 A | 2/2018 |
| CN | 109037460 A | 12/2018 |
| JP | 2006231869 A | 9/2006 |
| JP | 2012513364 A | 6/2012 |
| JP | 2013159553 A | 8/2013 |
| JP | 2013540623 A | 11/2013 |
| JP | 20153853 A | 1/2015 |
| JP | 201511271 A | 1/2015 |
| JP | 2015214684 A | 12/2015 |
| JP | 2016184052 A | 10/2016 |
| JP | 2018124363 A | 8/2018 |
| JP | 2019117228 A | 7/2019 |
| WO | 2019151344 A1 | 8/2019 |
| WO | 2019167897 A1 | 9/2019 |

* cited by examiner

*Primary Examiner* — Cheng Yuan Huang
(74) *Attorney, Agent, or Firm* — Li & Cai Intellectual Property (USA) Office

(57) ABSTRACT

An infrared shielding film and a method for manufacturing the same are provided. The infrared shielding film includes an infrared absorbing layer and a first infrared reflecting layer disposed on a surface of the infrared absorbing layer. The infrared absorbing layer contains a uniform distribution of composite tungsten oxide particles that are present in an amount of 0.1% to 10% by weight based on the total weight of the infrared absorbing layer. The first infrared reflecting layer contains a uniform distribution of titanium oxide particles that are present in an amount of 0.1% to 10% by weight based on the total weight of the first infrared reflecting layer.

6 Claims, 3 Drawing Sheets

INFRARED SHIELDING FILM AND METHOD FOR MANUFACTURING THE SAME

CROSS-REFERENCE TO RELATED PATENT APPLICATION

This application claims the benefit of priority to Taiwan Patent Application No. 109106145, filed on Feb. 26, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a heat-insulating structure, and more particularly to an infrared shielding film and a method for manufacturing the same.

BACKGROUND OF THE DISCLOSURE

Due to the phenomenon of global warming, the demand for insulating heat and saving energy has been increased. For example, when sunlight is transmitted into indoors through the glass window, the infrared ray in the sunlight may cause the rise in temperature. Therefore, there is a need to use a ventilation system or a temperature cooling device to lessen the discomfort brought by the high temperature. According to reports, in summer, the sun radiation which came into indoors through the glass window significantly increased the energy consumption of an air-conditioning device. It can therefore be seen that the heat insulation properties of the windows in the buildings have a huge impact on indoor temperature. Similarly, the heat insulation properties of car windows are also key factors in determining the in-car temperature.

One of the current and commonly-used ways for insulating heat is largely disposing a metal infrared reflective layer or a dyed layer on the target. The metal infrared reflective layer is capable of reflecting infrared and ultraviolet ray; however, the related product of metal infrared ray reflective layer may cause light pollution. The dyed layer can absorb infrared ray; nevertheless, the effect of heat insulation is undesired and the color of the dyed layer is prone to fade. An alternative way for insulating heat is to use metal coating layer (for example, silver coating layer) with dielectric layer to form a multi-layer film structure. By leveraging on the interference of light, the multi-layer film structure can selectively allow the visible light to pass through but hinder the infrared ray. However, this way is featured with large investment on the infrastructure, high cost on ingredients, and low product yield. The existing Low-E glass is not decorative, and it still has room for improvement in the effectiveness of heat insulation. Moreover, the glass product itself is fragile and cannot be repeatedly processed. Therefore, the related application is somewhat limited.

The conventional manufacturing method for infrared shielding layers is to firstly mix the insulation particles and the polymer materials for granulation, and next, to form a layer from the melted polyester particles. The polymerization and the granulation are both processed in a high temperature environment. The heat-processing time is relatively longer. Furthermore, the existing infrared shielding layers are normally added with large amount of heat-insulating particles for achieving a better heat-insulating effect, which inevitably increases the haze properties of layers.

With the growing adoption of glass windows and glass appearances (for example, glass curtain walls) in modern architecture and the rapid growth of automobile usages, developing a new material for insulating heat and saving energy has therefore become an urgent and highly important subject.

SUMMARY OF THE DISCLOSURE

In response to the above-referenced technical inadequacies, the present disclosure provides an infrared shielding film with dual functions of infrared reflection and infrared absorption and a method, which can reduce heat history, for manufacturing the infrared shielding film.

In one aspect, the present disclosure provides an infrared shielding film, which includes an infrared absorbing layer and a first infrared reflecting layer. The infrared absorbing layer contains a uniform distribution of composite tungsten oxide particles that are present in an amount of 0.1% to 10% by weight, based on the total weight of the infrared absorbing layer, and have a formula of $Cs_xM_yWO_{3-z}N_c$, wherein Cs represents cesium, M represents tin (Sn), antimony (Sb) or bismuth (Bi), W represents tungsten, O represents oxygen, N represents fluorine (F), chlorine (Cl) or bromine (Br), and x, y, z and c are each a positive integer and meet the conditions of $x \leq 1.0$, $y \leq 1.0$, $y/x \leq 1.0$, $z \leq 0.6$, and $c \leq 0.1$. The first infrared reflecting layer is disposed on a surface of the infrared absorbing layer and contains a uniform distribution of titanium oxide particles that are present in an amount of 0.1% to 10% by weight, based on the total weight of the first infrared reflecting layer.

In certain embodiments, the composite tungsten oxide particles of the infrared absorbing layer each have a particle diameter between 1 nm and 50 nm. The titanium oxide particles of the first infrared reflecting layer each have a particle diameter between 30 nm and 80 nm.

In certain embodiments, a thickness of the infrared shielding film is between 12 μm and 50 μm, and a thickness of the first infrared reflecting layer is 3% to 20% of the thickness of the infrared shielding film.

In certain embodiments, the infrared shielding film further includes a second infrared reflecting layer that is disposed on another opposite surface of the infrared absorbing layer and has a uniform distribution of titanium oxide particles. The titanium oxide particles are present in an amount of 0.1% to 10% by weight, based on the total weight of the second infrared reflecting layer.

In certain embodiments, the composite tungsten oxide particles of the infrared absorbing layer each have a particle diameter between 1 nm and 50 nm. The titanium oxide particles of the first infrared reflecting layer each have a particle diameter between 30 nm and 80 nm. The titanium oxide particles of the second infrared reflecting layer each have a particle diameter between 30 nm and 80 nm.

In certain embodiments, a thickness of the infrared shielding film is between 12 μm and 50 μm, and the sum of thicknesses of the first infrared reflecting layer and the second infrared reflecting layer is 6% to 40% of the thickness of the infrared shielding film.

In certain embodiments, the infrared shielding film has an infrared cut rate between 30% and 99% according to the JIS R3106 test standard and a haze value between 0.05% and 2% according to the JIS K7705 test standard.

In another aspect, the present disclosure provides a method for manufacturing an infrared shielding film, which includes: providing a first heat-insulating slurry material containing composite tungsten oxide particles and at least one second heat-insulating slurry material containing titanium oxide particles, wherein the composite tungsten oxide particles have a formula of $CS_xM_yWO_{3-z}N_c$, Cs represents cesium, M represents tin (Sn), antimony (Sb) or bismuth (Bi), W represents tungsten, O represents oxygen, N represents fluorine (F), chlorine (Cl) or bromine (Br), and x, y, z and c are each a positive integer and meet the conditions of $x \leq 1.0$, $y \leq 1.0$, $y/x \leq 1.0$, $z \leq 0.6$, and $c \leq 0.1$; and forming a polyester masterbatch into a multi-layered structure by a co-extrusion process, wherein the first heat-insulating slurry material and the at least one second heat-insulating slurry material are respectively applied to an inner molten layer and an outer molten layer that are laminated together in the co-extrusion process, so as to allow the multi-layered structure to include an infrared absorbing layer and a first infrared reflecting layer formed on a surface of the infrared absorbing layer. The composite tungsten oxide particles are present in an amount of 0.1% to 10% by weight based on the total weight of the infrared absorbing layer, and the titanium oxide particles are present in an amount of 0.1% to 10% by weight based on the total weight of the first infrared reflecting layer.

In certain embodiments, in the step of forming the multi-layered structure, the at least one second heat-insulating slurry material is applied to another outer molten layer to allow the multi-layered structure to further include a second infrared reflecting layer formed on another opposite surface of the infrared absorbing layer. The titanium oxide particles are present in an amount of 0.1% to 10% by weight based on the total weight of the second infrared reflecting layer.

In certain embodiments, the composite tungsten oxide particles are present in an amount of 0.01% to 30% by weight based on the total weight of the first heat-insulating slurry material and each have a particle diameter between 1 nm and 50 nm. The titanium oxide particles are present in an amount of 0.01% to 30% by weight based on the total weight of the at least one second heat-insulating slurry material and each have a particle diameter between 30 nm and 80 nm.

Therefore, by virtue of "an infrared absorbing layer contains a uniform distribution of composite tungsten oxide particles" and "at least one infrared reflecting layer contains a uniform distribution of titanium oxide particles", the infrared shielding film of the present disclosure has dual functions of infrared reflection and infrared absorption, and has optical properties such as high light transmittance and low haze values so as to meet the application requirements of high heat insulation performance and sufficient visibility, which are required for thermal insulation products. It can be seen from test results that the visible light transmittance of the infrared shielding film can reach 88%, the haze value of the infrared shielding film is at least less than 2% and can be lowered to 0.05%, and the infrared cut rate of the infrared shielding film is at least 90% and can reach 99%.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Figure 1:
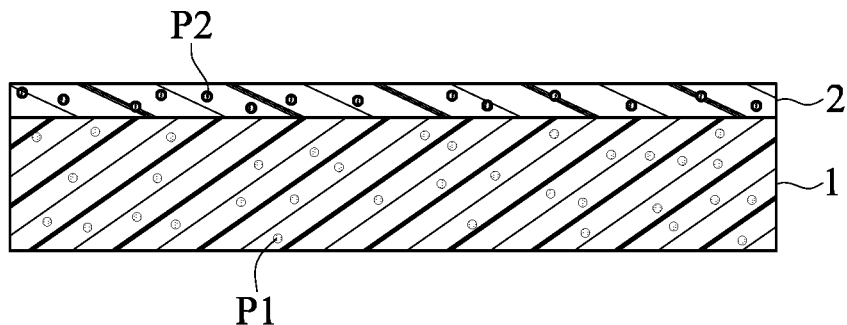
FIG. 1 is a structural schematic view of an infrared shielding film according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, a first embodiment of the present disclosure provides an infrared shielding film Z with dual functions of infrared reflection and infrared absorption. The infrared shielding film Z is a multi-layered structure, and mainly includes an infrared absorbing layer 1 and an infrared reflecting layer 2. The infrared absorbing layer 1, which serves as an inner layer of the infrared shielding film Z, contains a uniform distribution of composite tungsten oxide particles P1. The infrared reflecting layer 2, which serves as an outer layer of the infrared shielding film Z, is disposed on a surface (e.g., an upper surface) of the infrared absorbing layer 1 and contains a uniform distribution of titanium oxide ($TiO_2$) particles P2.

In use, the infrared shielding film Z can be attached to a target object (not shown) that needs to provide a balance between transparency and heat insulation performance, such that the infrared absorbing layer 1 and the infrared reflecting layer 2 can respectively absorb and reflect infrared lights in sunlight, and can allow the transmittance of visible lights. The target object is, for example, a glass window or a glass appearance of a building or a front/rear windshield or a left side/right side window of a car. Accordingly, the temperature rise effect of sunlight on an indoor environment can be reduced without affecting natural light transmission, thereby effectively reducing the energy consumption of an air conditioner.

More specifically, the infrared absorbing layer 1 and the infrared reflecting layer 2 are each formed of polyester, so that they have high transparency and good stiffness. Specific examples of the polyester include polyethylene terephthalate (PET), polypropylene terephthalate (PPT), polybutylene terephthalate (PBT), polyethylene naphthalate (PEN), polybutylene naphthalate (PBN), polycyclohexylenedimethylene terephthalate (PCT), polycarbonate (PC) and polyarylate. The polyester is preferably PET. In the present embodiment, the infrared absorbing layer 1 and the infrared reflecting layer 2 are biaxially stretched to have good flexibility and ductility, so as to increase the use flexibility of the infrared shielding film Z. For example, the infrared shielding film Z can adapt to a target object having a three-dimensional shape, i.e., can be smoothly attached to a surface of the target object.

In order to provide a balance between infrared absorption ability and light transmittance, the composite tungsten oxide particles P1 are present in an amount of 0.1% to 10% by weight based on the total weight of the infrared absorbing layer 1, and each have a particle diameter between 1 nm and 50 nm. Furthermore, in order to provide a balance between infrared reflection ability and light transmittance, the titanium oxide particles P2 are present in an amount of 0.1% to 10% by weight based on the total weight of the infrared reflecting layer 2, and each have a particle diameter between 30 nm and 80 nm. However, these technical details described in the present embodiment are exemplary and are not intended to limit the scope of the present disclosure. In the present embodiment, the thickness of the infrared reflecting layer 2 is 3% to 20% of the thickness of the infrared shielding film Z. The thickness of the infrared shielding film Z is between 12 µm and 50 µm, but is not limited thereto.

In certain embodiments, the present amount of the composite tungsten oxide particles P1 may be 1%, 2%, 3%, 4%, 5%, 6%, 7%, 8% or 9% by weight. The particle diameter of each of the composite tungsten oxide particles P1 may be 5 nm, 10 nm, 15 nm, 20 nm, 25 nm, 30 nm, 35 nm, 40 nm or 45 nm. The present amount of the titanium oxide particles P2 may be 1%, 2%, 3%, 4%, 5%, 6%, 7%, 8% or 9% by weight. The particle diameter of each of the titanium oxide particles P2 may be 5 nm, 30 nm, 40 nm, 50 nm, 60 nm, 70 nm or 80 nm.

In the present embodiment, the composite tungsten oxide particles P1 have a formula of $Cs_xM_yWO_{3-z}N_c$, wherein Cs represents cesium, M represents tin (Sn), antimony (Sb) or bismuth (Bi), W represents tungsten, O represents oxygen, N represents fluorine (F), chlorine (Cl) or bromine (Br), and x, y, z and c are each a positive integer and meet the conditions of $x \leq 1.0$, $y \leq 1.0$, $y/x \leq 1.0$, $z \leq 0.6$, and $c \leq 0.1$. It is worth mentioning that, the composite tungsten oxide particles P1 are each doped with specific metal and non-metal elements, in which the metal element(s) can remedy the deficiency of tungsten oxide molecules in infrared absorption ability, e.g., can increase the ability to absorb infrared lights with a wavelength between 850 nm and 2500 nm. Furthermore, the non-metal element can increase the weather resistant of the infrared absorbing layer 1.

It can be seen from test results that, the visible light transmittance of the infrared shielding film Z can reach 88%, the haze value of the infrared shielding film Z is at least less than 2% and can be lowered to 0.05%, and the infrared cut rate of the infrared shielding film Z is at least 90% and can reach 99%.

Tests of Visible Light Transmittance and Haze Value:

A testing device (model name "TC-HIII DPK", produced by Tokyo Denshoku Co., Ltd., Japan) was used to test the visible light transmittance and haze value of the infrared shielding film Z in accordance with JIS K7705 standard. The higher the visible light transmittance and the lower the haze value is, the better the transparency of the infrared shielding film Z is.

Test of Infrared Cut Rate (IR cut %):

A testing device (model name "LT-3000", produced by HOYA Corporation, Japan) was used to test the infrared light transmittance of the infrared shielding film Z in accordance with JIS R3106 standard. The infrared cut rate of the infrared shielding film Z was obtained by subtracting its infrared light transmittance from 100%. The higher the infrared cut rate is, the higher the heat-insulating effect of the infrared shielding film Z is.

Figure 2:
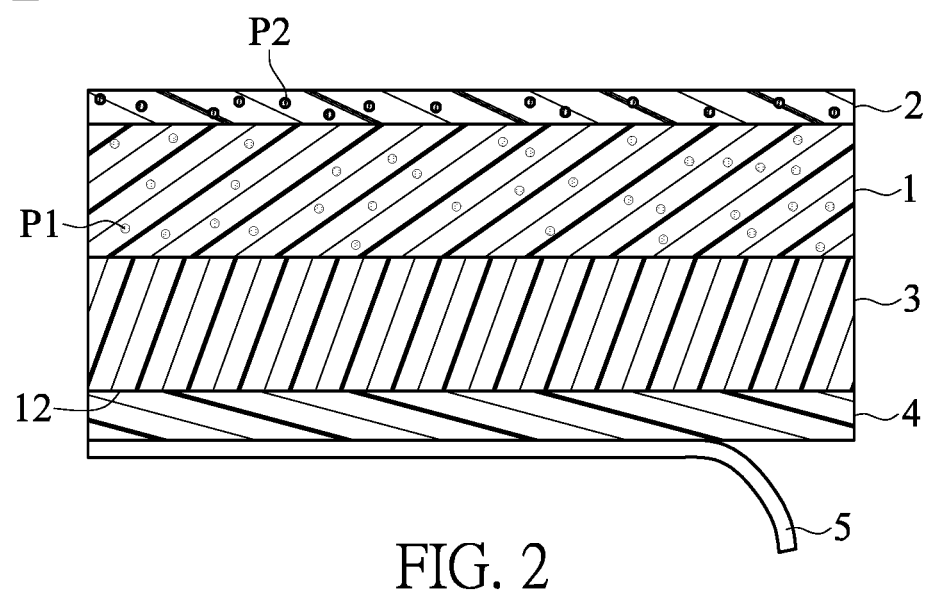
FIG. 2 is another structural schematic view of the infrared shielding film according to the first embodiment of the present disclosure.

Referring to FIG. 2, according to particular implementations, the infrared shielding film Z can further include a supporting layer 3, a bonding layer 4 and a temporary cover layer 5. The supporting layer 3 and the bonding layer 4 are disposed on the other opposite surface (e.g., a lower surface) of the infrared absorbing layer 1 in sequential order, and the temporary cover layer 5 is covered on a surface of the bonding layer 4. The supporting layer 3 can provide good support to the infrared absorbing layer 1 and the infrared reflecting layer 2, so as to allow them to respectively achieve an expected function. The bonding layer 4 can be used to arrange the infrared absorbing layer 1 and the infrared reflecting layer 2 onto a specific area of the surface of the target object in an attaching manner. The temporary cover layer 5, before being attached, can prevent the surface of the bonding layer 4 from coming in contact with dirt, which may cause a decrease in bonding strength.

In the present embodiment, the supporting layer 3 can be formed of polyester, specific examples of which are mentioned above, and preferably PET. The thickness of the supporting layer 3 can be between 20 µm and 125 µm. The bonding layer 4 can be formed of polyurethane, acrylic, polyester, polyvinyl alcohol, ethylene vinyl acetate, or any combination thereof. The thickness of the bonding layer 4 can be between 10 µm and 50 µm. The material and thickness of the temporary cover layer 5 are not particularly limited insofar as the temporary cover layer 5 is stably attached to the surface of the bonding layer 4. However, these details are merely exemplary and are not intended to limit the present disclosure.

Second Embodiment

Figure 3:
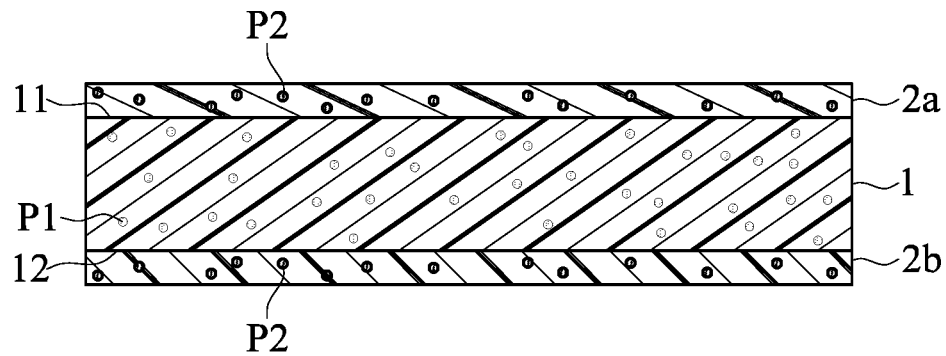
FIG. 3 is a structural schematic view of an infrared shielding film according to a second embodiment of the present disclosure.

Referring to FIG. 3, a second embodiment of the present disclosure provides an infrared shielding film Z, which mainly includes an infrared absorbing layer 1, a first infrared reflecting layer 2a and a second infrared reflecting layer 2b.

The infrared absorbing layer 1 has a first surface 11 and a second surface 12 which are opposite to each other. The first surface 11 and the second surface 12 are, for example, an upper surface and a lower surface of the infrared absorbing layer 1. The infrared absorbing layer 1 contains a uniform distribution of composite tungsten oxide particles P1. The first infrared reflecting layer 2a is disposed on the first surface 11 of the infrared absorbing layer 1. The second infrared reflecting layer 2b is disposed on the second surface 12 of the infrared absorbing layer 1. The first infrared reflecting layer 2a and the second infrared reflecting layer 2b each contain a uniform distribution of titanium oxide ($TiO_2$) particles P2.

In the present embodiment, the composite tungsten oxide particles P1 of the infrared absorbing layer 1 are present in an amount of 0.1% to 10% by weight, based on the total weight of the infrared absorbing layer 1, and each have a particle diameter between 1 nm and 50 nm. The titanium oxide particles P2 of the first infrared reflecting layer 2a are present in an amount of 0.1% to 10% by weight, based on the total weight of the first infrared reflecting layer 2a, and each have a particle diameter between 1 nm and 50 nm. The titanium oxide particles P2 of the second infrared reflecting layer 2b are present in an amount of 0.1% to 10% by weight, based on the total weight of the second infrared reflecting layer 2b, and each have a particle diameter between 30 nm and 80 nm. Furthermore, the thickness of the infrared shielding film Z is between 12 μm and 50 μm, and the sum of thicknesses of the first infrared reflecting layer 2a and the second infrared reflecting layer 2b is 6% to 40% of the thickness of the infrared shielding film Z.

Figure 4:
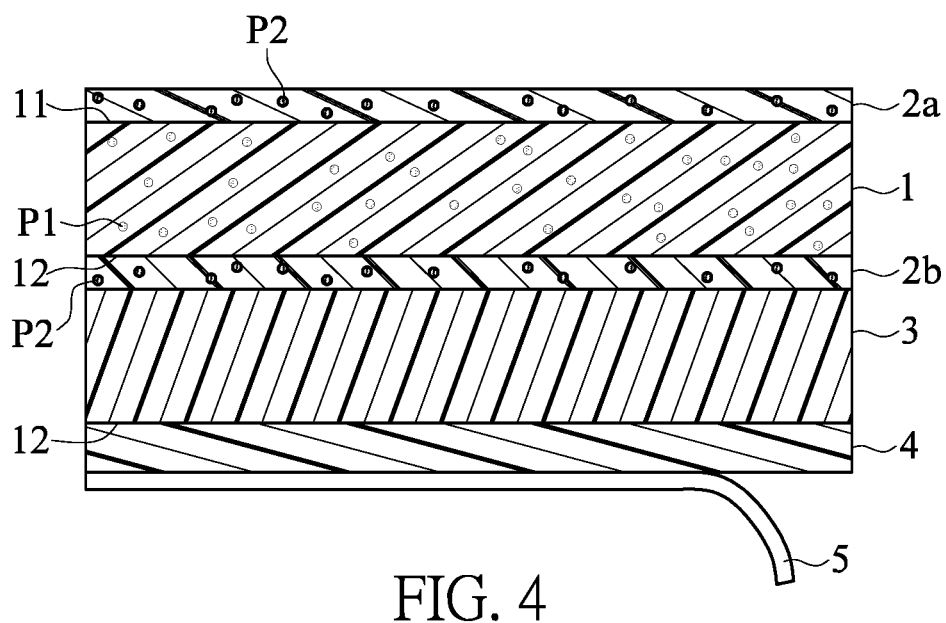
FIG. 4 is another structural schematic view of the infrared shielding film according to the second embodiment of the present disclosure.

Referring to FIG. 4, the infrared shielding film Z can further include a supporting layer 3, a bonding layer 4 and a temporary cover layer 5. The supporting layer 3 corresponds in position to the second surface 12 of the infrared absorbing layer 1, and is connected to the second infrared reflecting layer 2b. The bonding layer 4 is disposed on the supporting layer 3, and the temporary cover layer 5 is covered on a surface of the bonding layer 4. In an embodiment (not shown), the supporting layer 3 can correspond in position to the second surface 12 of the infrared absorbing layer 1, and is connected to the first infrared reflecting layer 2a. Other implementation details of the infrared shielding film Z have been described in the first embodiment, and will not be reiterated herein.

Third Embodiment

Figure 5:
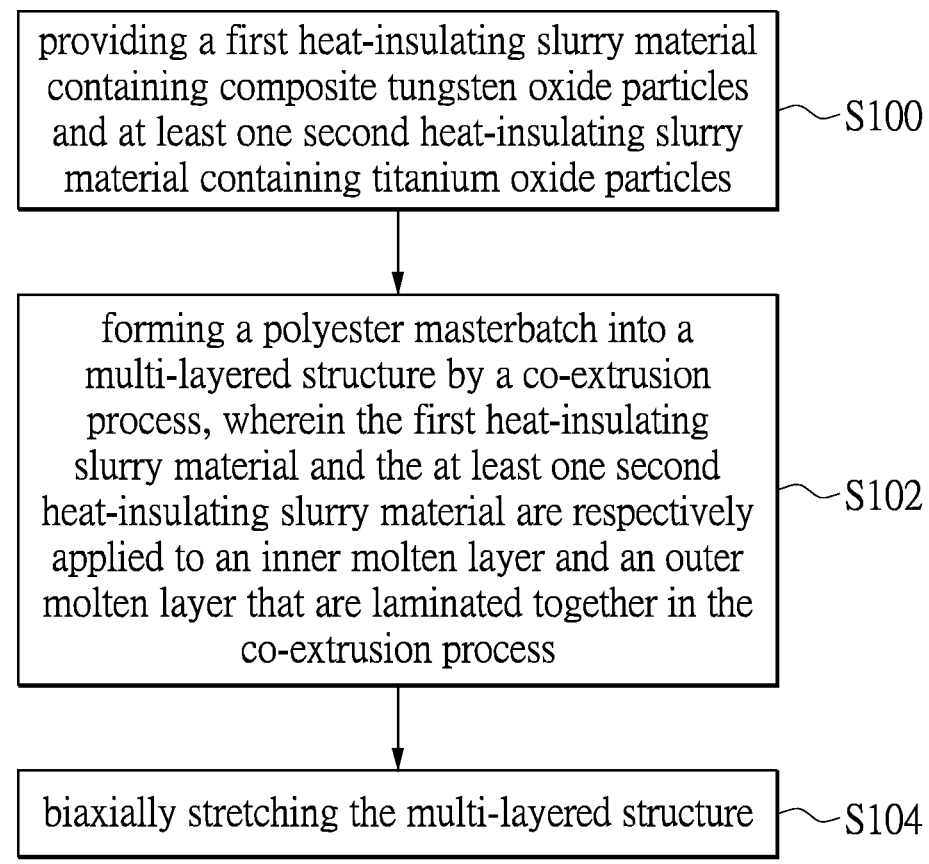
FIG. 5 is a flowchart of a method for manufacturing the infrared shielding film of the present disclosure.

Referring to FIG. 5, a third embodiment of the present disclosure provides a method for manufacturing an infrared shielding film, which mainly includes: step S100, providing a first heat-insulating slurry material containing composite tungsten oxide particles and at least one second heat-insulating slurry material containing titanium oxide particles; and step S102, forming a polyester masterbatch into a multi-layered structure by a co-extrusion process, wherein the first heat-insulating slurry material and the at least one second heat-insulating slurry material are respectively applied to an inner molten layer and an outer molten layer that are laminated together in the co-extrusion process. The method, according to particular implementations, can further include step S104, biaxially stretching the multi-layered structure.

With reference to FIG. 1 and FIG. 3, an infrared shielding film Z can be obtained after the completion of step S102, which includes an infrared absorbing layer 1 and an infrared reflecting layer 2 formed on a surface of the infrared absorbing layer 1, as shown in FIG. 1. Also, the infrared shielding film Z can include an infrared absorbing layer 1, a first infrared reflecting layer 2a formed on a surface of the infrared absorbing layer 1, and a second infrared reflecting layer 2b formed on the other opposite surface of the infrared absorbing layer 1, as shown in FIG. 3. The technical details of the infrared absorbing layer 1 and the infrared reflecting layer 2 (the first and second infrared reflecting layers) have been described in the first embodiment, and will not be reiterated herein.

More specifically, the first heat-insulating slurry material can be prepared by the following method. Firstly, the composite tungsten oxide particles having the above-mentioned formula are added to an alcohol solvent (e.g., ethylene glycol), and the resulting mixture is fully stirred and then allowed to stand for a period of time to obtain a first heat-insulating particle dispersion. In order to increase the dispersivity of the composite tungsten oxide particles in the first heat-insulating particle dispersion, an appropriate amount of a dispersant can be added to the first heat-insulating particle dispersion. After that, the first heat-insulating particle dispersion is wet-milled until it has an appropriate viscosity and the composite tungsten oxide particles each have a particle size between 1 nm and 50 nm. Similarly, the second heat-insulating slurry material can be prepared by the following method. Firstly, the titanium oxide particles are added to another alcohol solvent (e.g., ethylene glycol), and the resulting mixture is fully stirred and then allowed to stand for a period of time to obtain a second heat-insulating particle dispersion. In order to increase the dispersivity of the titanium oxide particles in the second heat-insulating particle dispersion, an appropriate amount of a dispersant can be added to the second heat-insulating particle dispersion. After that, the second heat-insulating particle dispersion is wet-milled until it has an appropriate viscosity and the titanium oxide particles each have a particle size between 30 nm and 80 nm.

The dispersant is exemplified by an anionic dispersant, a nonionic dispersant and a polymer dispersant. The anionic dispersant can be an acrylic-based anionic dispersant, specific examples of which include ammonium polyacrylate (co)polymer, sodium polyacrylate (co)polymer, styrene-acrylic acid (co)polymer, and sodium carboxylate (co)polymers. Specific examples of the nonionic dispersant include fatty alcohol ethoxy compounds and polyoxyethylene alkyl ethers. The polymer dispersant can be a copolymer with multiple anchoring groups, specific examples of which include polycarboxylic acids ester, polyester polyols having sulfonic acid group(s), polyphosphate, polyurethane and modified polyacrylate polymers.

In the biaxial stretching process, the infrared shielding film Z, which is unstretched, is preheated at a stretch temperature from 50° C. to 150° C. and is then stretched in a width direction (also referred to as "transverse direction (TD)") at a stretch ratio from 2 to 5 times, and preferably from 3 to 4 times. After that, the infrared shielding film Z is then stretched in a length direction (also referred to as "longitudinal direction (MD)") at a stretch ratio from 1.0 to 2.5 times, and preferably from 1.0 to 1.5 times.

Therefore, by virtue of "an infrared absorbing layer contains a uniform distribution of composite tungsten oxide particles" and "at least one infrared reflecting layer contains a uniform distribution of titanium oxide particles", the infrared shielding film of the present disclosure has dual functions of infrared reflection and infrared absorption, and has optical properties such as high light transmittance and low haze values so as to meet the application requirements of high heat insulation performance and sufficient visibility, which are required for thermal insulation products. It can be seen from test results that the visible light transmittance of the infrared shielding film can reach 88%, the haze value of the infrared shielding film is at least less than 2% and can be lowered to 0.05%, and the infrared cut rate of the infrared shielding film is at least 90% and can reach 99%.

Different from the conventional process, including the steps of mixing composite tungsten oxide particles/titanium oxide particles with a polyester material (e.g., a dibasic acid and a diol), granulating the resulting composition, and melt-extruding the resulting polyester granules to form a film, the method of the present disclosure applies a slurry having composite tungsten oxide particles/titanium oxide particles to a molten layer in a melt-extrusion stage, thereby reducing heat history.

The infrared shielding film of the present disclosure can reduce the temperature rise effect of sunlight on an indoor environment, and therefore it contributes greatly to energy saving and carbon footprint reduction. In addition, the infrared shielding film of the present disclosure is easy to be used and reworked.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An infrared shielding film, comprising:
   an infrared absorbing layer containing a uniform distribution of composite tungsten oxide particles that are present in an amount of 0.1% to 10% by weight, based on the total weight of the infrared absorbing layer, and have a formula of $Cs_xM_yWO_{3-z}N_c$, wherein Cs represents cesium, M represents tin (Sn), antimony (Sb) or bismuth (Bi), W represents tungsten, O represents oxygen, N represents fluorine (F), chlorine (Cl) or bromine (Br), and x, y, z and c are each a positive integer and meet the conditions of $x \leq 1.0$, $y \leq 1.0$, $y/x \leq 1.0$, $z \leq 0.6$, and $c \leq 0.1$; and
   a first infrared reflecting layer being disposed on a surface of the infrared absorbing layer and containing a uniform distribution of titanium oxide particles that are present in an amount of 0.1% to 10% by weight, based on the total weight of the first infrared reflecting layer;
   wherein a thickness of the infrared shielding film is between 12 μm and 50 μm, and a thickness of the first infrared reflecting layer is 3% to 20% of the thickness of the infrared shielding film.

2. The infrared shielding film according to claim 1, wherein the composite tungsten oxide particles of the infrared absorbing layer each have a particle diameter between 1 nm and 50 nm, and the titanium oxide particles of the first infrared reflecting layer each have a particle diameter between 30 nm and 80 nm.

3. The infrared shielding film according to claim 1, further comprising a second infrared reflecting layer being disposed on another opposite surface of the infrared absorbing layer and having a uniform distribution of titanium oxide particles that are present in an amount of 0.1% to 10% by weight, based on the total weight of the second infrared reflecting layer.

4. The infrared shielding film according to claim 3, wherein the composite tungsten oxide particles of the infrared absorbing layer each have a particle diameter between 1 nm and 50 nm, the titanium oxide particles of the first infrared reflecting layer each have a particle diameter between 30 nm and 80 nm, and the titanium oxide particles of the second infrared reflecting layer each have a particle diameter between 30 nm and 80 nm.

5. The infrared shielding film according to claim 4, wherein a thickness of the infrared shielding film is between 12 μm and 50 μm, and the sum of thicknesses of the first infrared reflecting layer and the second infrared reflecting layer is 6% to 40% of the thickness of the infrared shielding film.

6. The infrared shielding film according to claim 1, wherein the infrared shielding film has an infrared cut rate between 30% and 99% according to the JIS R3106 test standard and a haze value between 0.05% and 2% according to the JIS K7705 test standard.

* * * * *